United States Patent
Yamaguchi

(10) Patent No.: US 6,618,512 B1
(45) Date of Patent: Sep. 9, 2003

(54) IMAGE READING APPARATUS

(75) Inventor: Hiroshi Yamaguchi, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/599,724

(22) Filed: Jun. 23, 2000

(30) Foreign Application Priority Data

Jun. 24, 1999 (JP) .......................................... 11-177858

(51) Int. Cl.[7] .................................................. G06K 9/00
(52) U.S. Cl. ....................................................... 382/319
(58) Field of Search ................................ 382/312, 318, 382/319; 355/27–29, 40–41, 60–70; 356/237.1, 239.1; 250/341.8; 396/567, 639; 358/487

(56) References Cited

U.S. PATENT DOCUMENTS 5,991,010 A * 11/1999 Nishio .......................... 355/82
6,075,590 A * 6/2000 Edgar ....................... 356/237.1
6,195,161 B1 * 2/2001 Edgar ....................... 356/237.1
6,540,416 B2 * 4/2003 Edgar et al. ................. 396/565

FOREIGN PATENT DOCUMENTS

JP 11-75039 3/1999 ............ H04N/1/19

* cited by examiner

Primary Examiner—Jose L. Couso
(74) Attorney, Agent, or Firm—Sughrue Mion, PLLC

(57) ABSTRACT

In an image reading apparatus of the present invention which detects a defect portion in an image, a film image recorded on a photographic film is positioned in a reading position, the film image is pre-scanned for each of red, green and blue and, while reading conditions for fine-scanning are being computed on the basis of pre-scan image data obtained by pre-scanning, fine-scanning is begun and reading for IR light is performed under predetermined reading conditions. Then, reading for each of red, green and blue (fine-scanning) is performed under the computed reading conditions. Thus, reading time can be reduced.

8 Claims, 7 Drawing Sheets

FIG. 3A  TRANSMISSION OF LIGHT THROUGH A PHOTOGRAPHIC FILM
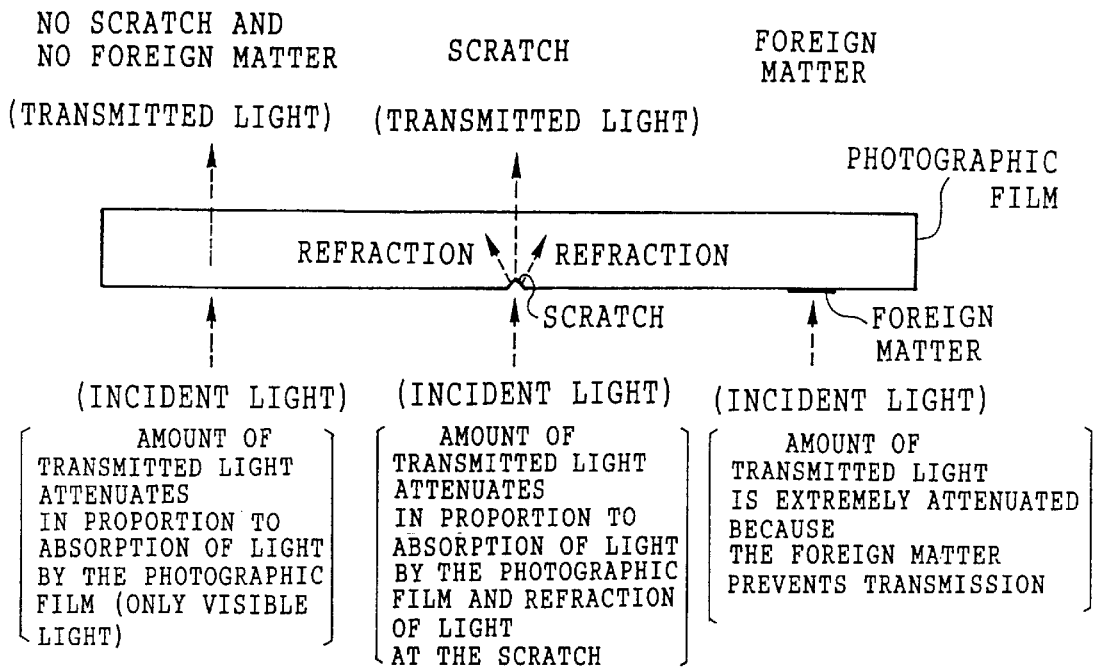
FIG. 3B  WHEN THERE IS A SCRATCH AT THE BACK SURFACE
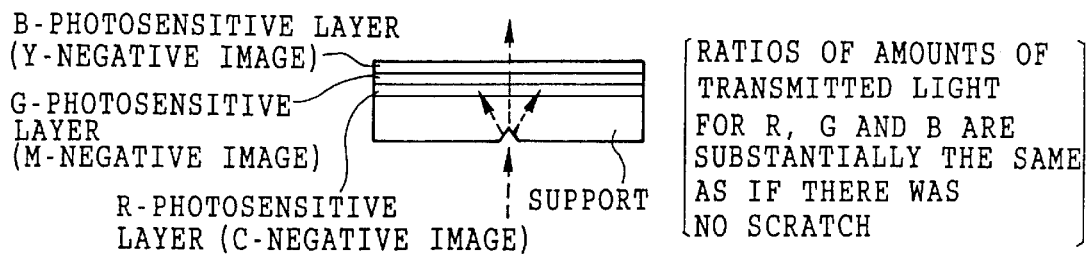
FIG. 3C  WHEN THERE IS A SCRATCH AT THE EMULSION SURFACE
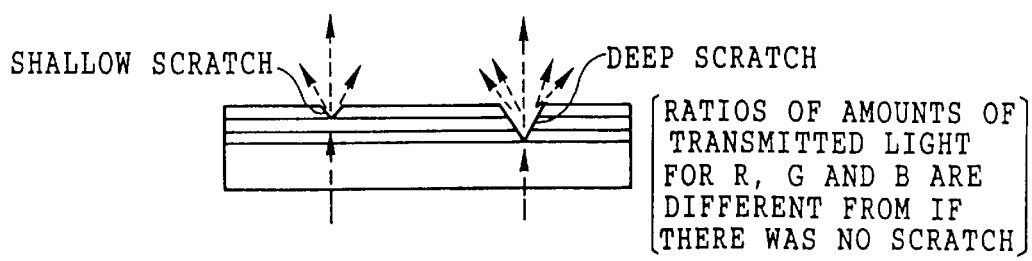

F I G. 5

| PRE-SCANNING R | PRE-SCANNING G | PRE-SCANNING B |

COMPUTATION OF READING CONDITIONS FOR FINE-SCANNING

| FINE-SCANNING IR |

| FINE-SCANNING IR | FINE-SCANNING R | FINE-SCANNING G | FINE-SCANNING B |

DETECTION AND CORRECTION PROCESSING FOR DEFECT PORTIONS OF IMAGE

IMAGE READING APPARATUS

BACKGROUND OF THE INVENTION

1. Field of the Invention

The present invention relates to an image reading apparatus, and more particularly, an image reading apparatus which reads images recorded on an image recording material such as a photographic photosensitive material.

2. Description of the Related Art

A photographic film may be scratched on an emulsion surface or a back surface (the surface opposite the emulsion surface) depending on how the film is handled. When a photographic film has a scratch on a portion that corresponds to an image recording area and an image recorded on the photographic film is output (i.e., the image is recorded on a recording material such as photographic printing paper, or displayed on a displaying means such as a display), the scratch on the photographic film is often, depending on the size, depth or type of the scratch, clearly visible on the output image as a defect portion, such as a low density streak or a white streak. Also, when a photographic film has foreign matter such as dust on the surface, the foreign matter is clearly visible on an output image as a defect portion.

A surface exposure type photographic printing apparatus, which exposes and records an image onto photographic printing paper by irradiating a photographic film with light such that light transmitted through the photographic film irradiates the photographic printing paper, includes a diffusion plate disposed between a light source and the photographic film and irradiates the photographic film with light diffused by the diffusion plate, as a countermeasure for scratches on the photographic film. However, with the above-described technique, defects in an output image (the image exposed and recorded on photographic printing paper) are only slightly reduced (the defect portions only become slightly less obtrusive).

As a technique applicable to an image reading apparatus which reads an image recorded on a photographic film by a reading sensor such as a CCD, Japanese Patent Application Laid-Open (JP-A) No. 11-75039 has disclosed a technique of reading a photographic film with at least four lights corresponding to four wavelength ranges (three wavelength ranges of visible light and one wavelength range of invisible light, for example, infrared or ultraviolet), and correcting image information obtained by visible light readings on the basis of information obtained by an invisible light reading.

Amounts of visible light transmitted through the photographic film vary with image density of an image recorded on the photographic film, and are also varied at a portion of the photographic film having a scratch or foreign matter because a portion of the visible light irradiated to the portion of the photographic film is refracted or reflected at the portion of the photographic film. On the other hand, although amounts of invisible light transmitted through the photographic film vary at the portion of the photographic film having the scratch or foreign matter, the amounts are not affected by density of the image recorded on the photographic film.

Therefore, in accordance with the technique described in JP-A No. 11-75039, by detecting scratches and foreign matter on the photographic film on the basis of variations in amounts of invisible light transmitted through the photographic film, corrections for variations in amounts of visible light transmitted through the photographic film, which variations are due to scratches and foreign matter on the photographic film, i.e., corrections for defect portions in an image (an image represented by image information obtained by visible light readings) caused by the scratches and foreign matter on the photographic film, can be made with assurance.

To read an image recorded on a photographic film with high accuracy, it is desirable to read the image preliminarily at a relatively low resolution (pre-scanning), determine reading conditions on the basis of results of pre-scanning, and then read the image finally at a relatively high resolution (fine-scanning) under the determined reading conditions. However, in the technique described in JP-A No. 11-75039, optimal timing of reading with invisible light when two readings, pre-scanning and fine-scanning, are performed is not considered.

For example, when two readings, pre-scanning and fine-scanning, are performed, reading with invisible light may be performed during both pre-scanning and fine-scanning. In such a case, by performing a reading with invisible light during pre-scanning, status of defect portions can be tested, for example, during an image test carried out on the basis of an image displayed on a display or the like and, by performing a reading with invisible light during fine-scanning, defect portions can be detected with high accuracy and highly accurate corrections can be made, because the reading is performed at a high resolution. However, a problem with reading with invisible light during both of pre-scanning and fine-scanning is that reading takes a long time.

As described above, timing of reading with invisible light greatly affects accuracy of correction for defect portions and reading speed. However, required levels of accuracy of correction for defect portions, reading speed and the like when reading an image often differ between individual cases. For example, there are cases in which high reading speed is desired but high accuracy of correction for defect portions is not required. Conversely, there are cases in which a high quality image whose defect portions are corrected with high accuracy is desired even if reading speed is slow.

SUMMARY OF THE INVENTION

The present invention is intended to solve the above-described problems, and the first object of the present invention is to provide an image reading apparatus which detects defect portions in an image and can reduce reading time.

The second object of the present invention is to provide an image reading apparatus which can perform image reading so as to satisfy various requirements.

A first aspect of the present invention, to accomplish the first object, is an image reading apparatus including a reader which reads an image recorded on an image recording material; a detector which irradiates the image recording material with first light in an invisible region and detects second light in the invisible region which is one of the first light transmitted through and reflected from an image recording area in which the image is recorded; and a controller which effects control such that a preliminary reading of the image is performed by the reader, after which detection of the second light in the invisible region is performed by the detector, after which, and a fine reading of the image is performed by the reader under reading conditions determined on the basis of information obtained by the preliminary reading.

In the first aspect of the present invention, the reader reads the image recorded on the image recording material, and the detector detects the light transmitted through or reflected from the image recording area of the image recording material in which the image is recorded (the second light). Thereby, defect portions due to scratches or foreign matter in the image recording area of the image recording material can be detected on the basis of result of detection of the second light by the detector. Further, image data for which defect portions due to scratches and foreign matter on the image recording material have been corrected can be obtained by, for example, correcting image data obtained by reading of the image by the reader on the basis of results of detection of the second light by the detector.

Further, in the first aspect of the present invention, the controller effects control of the reader and the detector so as to perform the detection of the second light by the detector after the preliminary reading by the reader is performed, and then to perform the final reading (fine reading) by the reader. That is, detection of the second light by the detector can be performed only once, thereby reducing image reading time. When detection for defect portions due to scratches or foreign matter on the image recording material is carried out on the basis of results of detection of the second light in invisible region by the detector, detection of defect portions on the basis of results of the detection of the second light in invisible region can be carried out in parallel with the final reading by the reader. Therefore, in the first aspect of the present invention, image reading time of the image reading apparatus which detects defect portions in an image can be reduced.

A second aspect of the present invention is the first aspect of the present invention, wherein the controller starts detection of the second light in the invisible region by the detector before determination of the reading conditions has finished.

When invisible light (the first light) irradiates the image recording area, the amount of invisible light transmitted through or reflected from the image recording area of the image recording material (the second light) is not affected by image density of the image recorded on the image recording material. Therefore, detection of the second light by the detector can be carried out before reading conditions for the final reading are determined, on the basis of information obtained by the preliminary reading by the reader, or during computation of the reading conditions. Thus, in the second aspect of the present invention, the control means starts detection of the second light in invisible region by the detector after the preliminary reading is performed by the reader and before the determination of the reading conditions for the final reading is finished (during computation of the reading conditions and the like). Because detection of the second light by the detector can be carried out in parallel with computation of the reading conditions, reading time of the image reading apparatus can be reduced.

A third aspect of the present invention is the first aspect of the present invention, wherein the fine reading and detection of the second light in the invisible region by the detector are performed at a same resolution.

In the third aspect of the present invention, because the final reading and detection of the second light in invisible region by the detector, as described for the first aspect of the present invention, are performed at the same resolution, there will be no difference between resolution of image data obtained by the final reading by the reader and resolution of data representing results of detection of the second light in invisible region by the detector. Therefore, defect portions can be corrected without correction errors being generated due to a difference between resolutions, and defect portions (defect portions in image data due to scratches and foreign matter) can be corrected with assurance.

A fourth aspect of the present invention, to accomplish the second object, is an image reading apparatus including a reader which reads an image recorded on an image recording material; a detector which irradiates the image recording material with first light in an invisible region and detects second light in the invisible region which is one of the first light transmitted through and reflected from an image recording area in which the image is recorded; an input section for inputting information that instructs whether or not detection of the second light in the invisible region by the detector is performed and, if detection of the second light in the invisible region is to be performed, information that instructs an execution timing of the detection of the second light in the invisible region; and controller which effects control such that a preliminary reading of the image is performed by the reader, after which a fine reading of the image is performed by the reader under reading conditions determined on the basis of information obtained by the preliminary reading and, if the detection of the second light in the invisible region has been instructed via the input section, effects control such that the second light in the invisible region is detected by the detector at at least one of the preliminary reading and the fine reading in accordance with the instructed execution timing.

In the fourth aspect of the present invention, the reader reads the image recorded on the image recording material and the detector detects the invisible light transmitted through or reflected from the image recording area of the image recording material (the second light). Thereby, defect portions due to scratches or foreign matter in the image recording area of the image recording material can be detected on the basis of results of detection of the second light by the detector. Further, image data for which defect portions due to scratches and foreign matter on the image recording material have been corrected can be obtained by, for example, correcting image data obtained by reading of the image by the reader on the basis of results of detection of the second light by the detector.

The controller effects control such that the preliminary reading of the image is performed by the reader, after which the fine reading of the image is performed by the reader under the reading conditions determined on the basis of information obtained by the preliminary reading, and, if the detection of the second light has been instructed via the input section, effects control such that the second light is detected by the detector at at least one of the preliminary reading and the fine reading in accordance with the instructed execution timing by the input section.

For example, in a case in which a high quality image whose defect portions are corrected with high accuracy is desired even if time taken for image reading is long, if information instructing performance of detection of the second light by the detector both at the preliminary reading and at the final reading (fine reading) is input via the inputting means, defect portion correction conditions can be tested on the basis of results of detection of the second light by the detector at the preliminary reading, for example, during an image test performed on the basis of an image displayed on a display or the like. On the basis of results of the test, highly accurate correction based on results of detection of the second light by the detector at the final reading can be carried out. As a further example, in a case in which accuracy of correction for defect portions is not required even if the high quality image could not be obtained, if information canceling detection of the second light by the detector both at the preliminary reading and at the final reading is input via the inputting means, the readings are carried out without performance of detection of the second light by the detector both at the preliminary reading and at the final reading. Therefore, time taken for image reading can be reduced.

Thus, in the fourth aspect of the present invention, because detection of the second light by the detector is controlled in accordance with information instructing whether or not detection of the second light by the detector is to be performed and the execution timing of detection, which information is input via the input section, image reading can be carried out so as to satisfy various requirements.

When the first, second and third aspects of the present invention are applied to an image reading apparatus which reads an image recorded on a photographic photosensitive material, reading time can be reduced by an invention as described below.

An image reading apparatus including a reader which reads a plurality of images recorded on a photographic photosensitive material; a detector which irradiates the photographic photosensitive material with invisible light and detects invisible light, which light is one of transmitted through and reflected from an image recording area in which an image is recorded; and a controller which effects control such that after a preliminary reading by the reader is performed for the image, reading conditions for a final reading are computed on the basis of information obtained by the preliminary reading and, after detection of the invisible light, which light is one of transmitted through and reflected from the image recording area, by the detector is performed for the image, the final reading is performed for the image by the reader under the computed reading conditions.

BRIEF DESCRIPTION OF THE DRAWINGS

FIG. 3A is a conceptual diagram illustrating transmission of light respectively at a portion of a photographic film having no scratch and no foreign matter, at a portion having a scratch, and at a portion having foreign matter.

FIG. 3B is a conceptual diagram illustrating transmission of light in a case in which a photographic film has a scratch on a back surface.

FIG. 3C is a conceptual diagram illustrating transmission of light in cases in which a photographic film has a scratch on an emulsion surface.

FIG. 5 is a diagram illustrating timing of image reading in the first embodiment.

DESCRIPTION OF THE PREFERRED EMBODIMENTS

Examples of embodiments of the present invention will be explained in detail hereinafter with reference to the drawings.

First Embodiment

Figure 1:
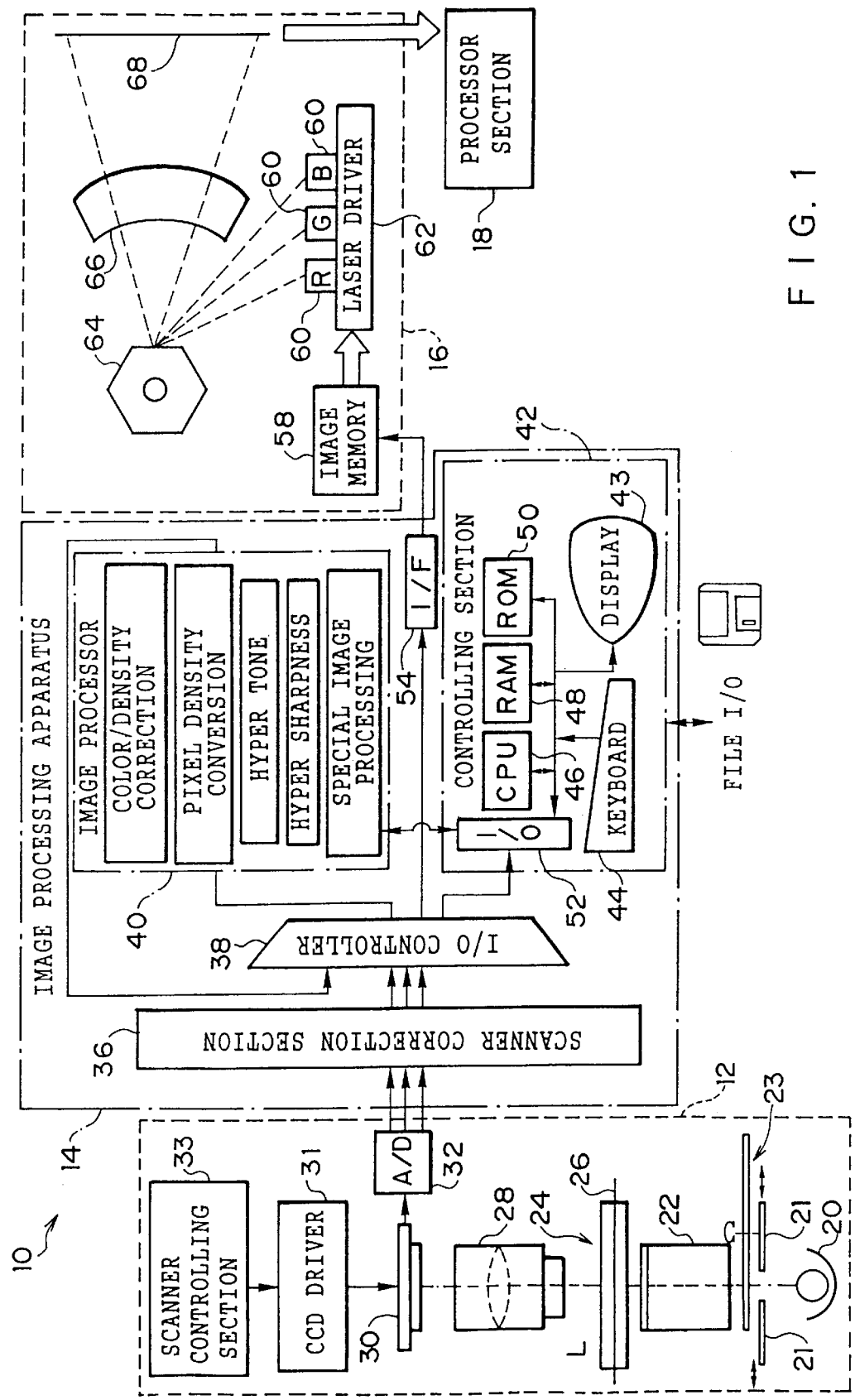
FIG. 1 is a schematic structural diagram of an image processing system relating to a present embodiment.

FIG. 1 shows an image processing system 10 relating to a present embodiment. In the image processing system 10, a film scanner 12, an image processing apparatus 14 and a printer 16 are serially connected. The film scanner 12 and the image processing apparatus 14 correspond to an image reading apparatus relating to the-present invention.

Figure 2:
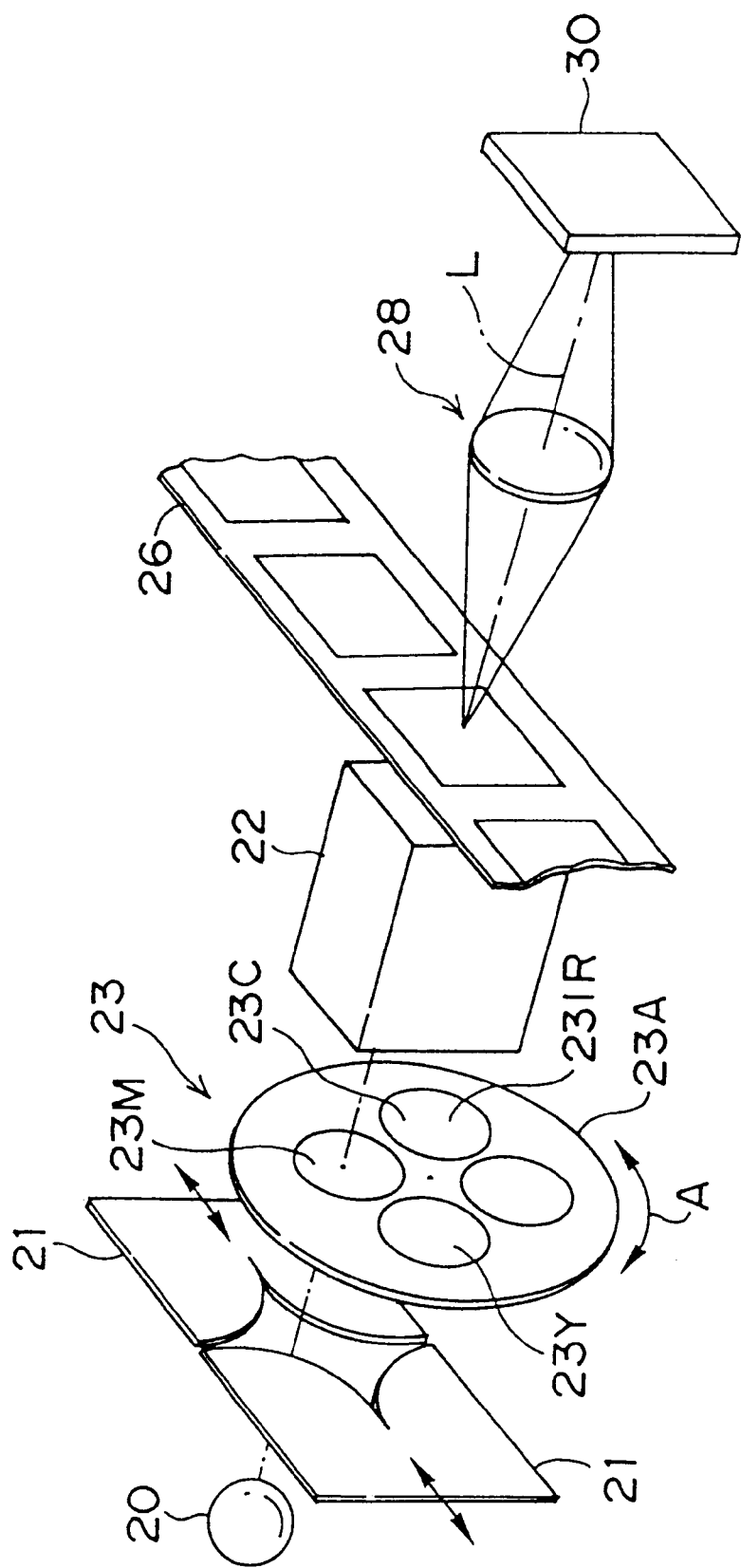
FIG. 2 is a perspective view illustrating a schematic structure of a film scanner.

The film scanner 12 reads film images (negative images or positive images of photographed subjects which images have been made visible by development processing) recorded on photographic photosensitive material (hereinafter simply called "photographic film"; for example, negative film and reversal film), and outputs image data obtained by the reading. As is also shown in FIG. 2, the film scanner 12 is provided with a light source 20 which is formed by a halogen lamp or the like and which irradiates a photographic film 26. Light emitted from the light source includes both light having wavelengths in the visible region and light having wavelengths in the infrared region.

At a light-emitting side of the light source 20, a diaphragm 21 which adjusts an amount of light irradiating the photographic film 26, a filter section 23, and a light diffusion box 22 which diffuses light irradiating the photographic film 26 are disposed, in that order. The filter section 23 is formed of four filters set in a turret 23A which is rotatable along a direction of an arrow A of FIG. 2: a filter 23C transmits only incident light in a wavelength range corresponding to red (R-light); a filter 23M transmits only incident light in a wavelength range corresponding to green (G-light); a filter 23Y transmits only incident light in a wavelength range corresponding to blue (B-light); and a filter 23IR transmits only incident light in an infrared region (IR-light).

At a side of the photographic film 26 opposite the side at which the light source 20 is disposed, a lens 28 which focuses light transmitted through the photographic film 26 and an area CCD 30 are disposed, in that order, along an optical axis L. The area CCD 30 is a monochrome CCD at which a large number of CCD cells having sensitivity in the visible region and in the infrared region are arrayed in a matrix form. The area CCD 30 is disposed such that a light receiving surface thereof coincides with a position of a focusing point of the lens 28. A shutter (not shown in the drawings) is provided between the area CCD 30 and the lens 28.

The area CCD 30 is connected to a scanner controlling section. 33 via a CCD driver 31. The scanner controlling section 33 is provided with a CPU, a ROM (for example, a ROM whose stored contents are rewritable), a RAM and an input/output port, all of which are interconnected via a bus and the like. The CCD driver 31 generates driving signals for driving the area CCD 30 and controls driving of the area CCD 30.

The photographic film 26 is transported by a film carrier 24 (see FIG. 1, not shown in FIG. 2), and positioned in a position in which an image center of a film image coincides with the optical axis L (a reading position). While the film image of the photographic film 26 is positioned in the reading position, the turret 23A of the filter section 23 is rotated such that the filters 23C, 23M and 23Y of the filter section 23 are successively positioned on the optical axis L.

Thus, a film image recording area of the photographic film 26 is read successively with R-light, G-light and B-light (and IR-light), and signals corresponding to the film image are output from the area CCD 30. The signals output from the area CCD 30 are converted to digital image data by an A/D converter 32, and the image data is input to the image processing apparatus 14. The image data includes data of the R (red), G (green) and B (blue) (and IR (infrared)) wavelength ranges.

A scanner correction section 36 of the image processing apparatus 14 successively performs various correction processes, such as darkness correction, density conversion, shading correction and the like on the input image data. An output terminal of the scanner correction section 36 is connected to an input terminal of an I/O controller 38. Image data, which has been subjected to the above-mentioned various processes at the scanner correction section 36, is input to the I/O controller 38. Image data which has been subjected to image processing (described in detail below) is input to the input terminal of the I/O controller 38 from an image processor 40.

The I/O controller 38 is also connected to a controlling section 42. The controlling section 42 is provided with an extension slot (not shown). To this extension slot, a drive (not shown), which reads and writes data from and into an information storage medium such as a PC card or IC card which can be mounted to a digital still camera (hereinafter, these cards are called "digital cards"), a CD-R or the like, or a communication control device for communicating with other information processing devices, is connected. Image data that has been input from an external device via the extension slot is input to the I/O controller 38.

Output terminals of the I/O controller 38 are respectively connected to a data input terminal of the image processor 40 and the controlling section 42, and also to the printer 16 via an I/F circuit 54. The I/O controller 38 selectively outputs the input image data to each of the above-mentioned devices that are connected to the output terminals of the I/O controller 38.

In the present embodiment, each of film images recorded on the photographic film 26 is read twice, at different resolutions, at the film scanner 12. In a preliminary reading which is at a relatively low resolution (pre-scanning), each film image is read under reading conditions (respective amounts of R, G and B light irradiating the photographic film 26, and charge accumulation time of the area CCD 30) which are determined such that accumulated charge will not cause saturation at the area CCD 30 even if density of the film image is very low. Data obtained by this pre-scanning (pre-scan image data) is input from the I/O controller 38 to the controlling section 42.

The controlling section 42 is provided with a CPU 46, a RAM 48, a ROM 50 (for example, a ROM whose stored contents are rewritable), and an input/output port 52, which are interconnected via a bus. The controlling section 42 determines the size of the film image, computes image features such as density and the like of the film image on the basis of the pre-scan image data that has been input from the I/O controller 38, and determines reading conditions for a second, relatively high resolution reading of the film images by the film scanner 12 (fine-scanning). The determined reading conditions are output to the film scanner 12.

Further, the controlling section 42 performs computation of image features, identification (extraction) of a main portion of the film image (for example, an area corresponding to a person's face (face area)) on the basis of the pre-scan image data, automatically determines processing conditions for various image processings of image data that will be obtained by fine-scanning by the film scanner 12 (fine-scan image data), and outputs the determined (set-up operation) processing conditions to the image processor 40.

The controlling section 42 has a function to search for any defect portion generated in the image represented by the image data due to a scratch or foreign matter such as dust on the photographic film 26, on the basis of IR data input from the film scanner 12.

In addition, a display 43, a keyboard 44 and a mouse (not shown in the drawings) are connected to the bus of the controlling section 42.

On the basis of the computed processing conditions for image processing, the controlling section 42 creates simulation image data from pre-scan image data by image processing which is equivalent to image processing to be performed on fine-scan image data at the image processor 40. The generated simulation image data is then converted into signals for display on the display 43, and a simulation image is displayed on the display 43 on the basis of the signals. Tests of image quality and the like are performed on the displayed simulation image by an operator, and information instructing modification of the processing conditions is input via the keyboard 44 or the mouse as test results. Re-computation and the like of the processing conditions for image processing is performed on the basis of the information that is input.

Image data input to the I/O controller 38 after fine-scanning of the film image at the film scanner 12 (fine-scan image data) is input from the I/O controller 38 to the image processor 40.

The image processor 40 is provided with various image processing circuits to perform various kinds of image processing, such as color/density correction processes including gradation (gray scale) conversion and color conversion, a pixel density conversion process, a hyper tone process which compresses gradation of extremely low frequency luminance components of an image, a hyper sharpness process which enhances sharpness of an image while suppressing graininess of the image, and the like. The image processor 40 performs the various kinds of image processing on input image data according to processing conditions determined and informed by the controlling section 42 for each image. In addition, the image processor 40 has a function to correct defect portions found in an image by the controlling section 42.

If image data that has been processed at the image processor 40 will be used for recording the image onto photographic printing paper, the image data that has been processed at the image processor 40 is output from the I/O controller 38 through the I/F circuit 54 to the printer 16 as image data for recording. If the processed image data is to be output to an external device as an image file, the image data is output from the I/O controller 38 to the controlling section 42. The controlling section 42 outputs the image data, which has been input from the I/O controller 38 as image data to be output to the external device, via the extension slot to the external device (a drive, a communication control device, or the like, as mentioned above) as an image file.

The printer 16 is provided with an image memory 58, R, G and B laser sources 60 and a laser driver 62 which controls operation of the laser sources 60. The image data for recording which is input from the image processing apparatus 14 is temporarily stored in the image memory 58, and then read and used to modulate R, G and B laser beams (lights) emitted from the laser sources 60.

The R, G and B laser beams emitted from the laser sources 60 scan onto photographic printing paper 68 via a polygon mirror 64 and an fθ lens 66 to expose and record an image onto the photographic printing paper 68. The photographic printing paper 68 on which the image has been exposed and recorded is sent to a processor section 18 and subjected to processes such as color development, bleaching and fixing, washing with water, and drying. Thus, the image exposed and recorded on the photographic printing paper 68 is made visible.

With respect to operation of the present embodiment, principles of detection with IR-light of a portion of a photographic film having a scratch or foreign matter are explained first. As shown in FIG. 3A, when light irradiates a portion of a photographic film which has no scratch and no foreign matter on the surface thereof, an amount of transmitted light is attenuated from an amount of incident light by an attenuation amount corresponding to light absorption of the photographic film. A wavelength range in which absorption of light by the photographic film occurs corresponds roughly to the visible region and IR-light is scarcely absorbed. Therefore, when IR-light irradiates a portion of the photographic film surface which has no scratch and no foreign matter, an amount of transmitted (IR) light is almost the same as an amount of incident light.

On the other hand, when light irradiates a portion of the photographic film having a scratch, the irradiating light is partly refracted by the scratch. Therefore, when the visible light irradiates the portion of the photographic film having the scratch, an amount of transmitted light (an amount of light which rectilinearly transmits through the portion) is attenuated from an amount of incident light by an attenuation amount which is equal to an attenuation amount due to light absorption by the photographic film as described above plus an attenuation amount due to refraction of light at the scratch. Although FIG. 3A illustrates a case in which the photographic film has a scratch on a light incident side, a case in which a photographic film has a scratch on a light exit side is the same.

Refraction of light due to a scratch also occurs for IR-light. Therefore, when IR-light irradiates the portion of the photographic film having the scratch, an amount of transmitted IR-light is attenuated by an attenuation amount corresponding to attenuation due to refraction of light at the scratch. As shown in FIG. 3B as an example, refraction of light due to the scratch is more significant if the size (such as depth) of the scratch is larger (similarly for visible light and for IR-light). Therefore, when IR-light irradiates the portion of the photographic film having the scratch, the amount of transmitted light is smaller if the size of the scratch is larger. Thus, the size of a scratch on a photographic film can be detected on the basis of attenuation of the amount of irradiating IR-light.

When light irradiates a portion of a photographic film having foreign matter such as dust adhering thereto, the irradiating light is reflected by the foreign matter. Therefore, when light irradiates the portion having foreign matter, an amount of transmitted light is greatly attenuated by the foreign matter, depending on size and type (light transmittance) of the foreign matter. Attenuation of an amount of transmitted light when visible light irradiates the portion having foreign matter is the same as when IR-light irradiates the portion.

As described above, amounts of transmitted light when IR-light transmits through a photographic film vary only at portions of the photographic film having scratches or foreign matter, and transmission amounts are not affected by image density. Thus, scratches and foreign matter on a photographic film can be detected by irradiating the photographic film with IR-light and detecting amounts of transmitted light.

Correction of defect portions in an image represented by image data is explained next. As described above, transmitted light amounts of visible light (for example, R-light, G-light and B-light) change at a portion of a photographic film having a scratch or foreign matter. Therefore, in an image represented by image data obtained by photoelectrically converting visible light transmitted through the photographic film, luminance and color of an area corresponding to a portion having a scratch or foreign matter differ from correct luminance and color of the area (a defect portion due to a scratch or foreign matter).

As shown in FIG. 3B, an emulsion layer of a photographic film includes R-, G- and B-photosensitive layers. After a photographic film (negative film) which has had an image exposed and recorded thereon has been subjected to processes such as development and the like, a C-negative image is formed on the R-photosensitive layer, an M-negative image is formed on the G-photosensitive layer, and a Y-negative image is formed on the B-photosensitive layer. Of visible light transmitted through the photographic film, R-light is attenuated (absorbed) in accordance with transmission density of the C-negative image on the R-photosensitive layer, G-light is attenuated (absorbed) in accordance with transmission density of the M-negative image on the G-photosensitive layer, and B-light is attenuated (absorbed) in accordance with transmission density of the Y-negative image on the B-photosensitive layer.

As shown in FIG. 3B as an example, when a scratch is on a back surface, which is opposite to an emulsion surface, proportions of the amounts of light absorbed (or transmitted) respectively at R, G and B photosensitive layers to the amount of incident light are substantially the same as those in a case in which there is no scratch. That is, in FIG. 3B, if: $I_0$ represents an amount of light incident to the photographic film; $I_{0R}$, $I_{0G}$ and $I_{0B}$ respectively represent amounts of transmitted R-light, G-light and B-light when there is no scratch; $I_1$ represents an amount of light rectilinearly (in a direction indicated by dotted bold arrow in FIG. 3B) transmitted through a portion having a scratch and incident to an emulsion layer when there is a scratch ($I_1 < I_0$: $I_0 - I_1$, is an amount of light attenuated by the scratch); and $I_{1R}$, $I_{1G}$ and $I_{1B}$ respectively represent amounts of transmitted R-light, G-light and B-light when there is a scratch, then relationships of the amounts are represented by the following formula (1):

$$I_{0R}/I_0 \approx I_{1R}/I_1;\ I_{0G}/I_0 \approx I_{1G}/I_1;\ I_{0B}/I_0 \approx I_{1B}/I_1 \qquad (1)$$

Therefore, at a defect portion corresponding to a portion having a scratch on the back surface, compared with a case in which the portion has no scratch, only luminance differs and color information of an image recorded on the photographic film is preserved (does not differ). Accordingly, a defect portion in an image represented by image data can be corrected by modifying luminance of the defect portion area on the basis of a ratio, when IR-light irradiates the photographic film at the portion having the scratch, of an incident IR-light amount and an exit IR-light amount or another physical value (luminance modification method).

On the other hand, as shown in FIG. 3C as an example, when there is a scratch on the emulsion surface, if the scratch is shallow, not all of the photosensitive layers are cut. Therefore proportions of the amounts of light absorbed (or transmitted) respectively at R, G and B photosensitive layers to the amount of incident light are different from those when there is no scratch. However, if the scratch is very deep and all the photosensitive layers have been cut, no absorption of incident light occurs at the photosensitive layers. Therefore, the relationships represented by formula (1) do not apply for either of these two cases.

As described above, for a defect portion corresponding to a portion having a scratch on the emulsion surface, it is difficult to accurately correct the defect portion by modifying luminance because, regardless of the depth of the scratch, luminance and color of that portion are both different compared with those in a case in which there is no scratch and color information of that portion of the image recorded on the photographic film has been lost. Therefore, for correcting a defect portion corresponding to a portion having a scratch on the emulsion surface, a correction method in which luminance and density of the defect portion are determined by interpolation based on information about an area surrounding the defect portion (interpolation method) is suitable.

In addition, a defect portion generated by foreign matter adhering to a photographic film also has different luminance and color compared with those in a case in which there is no foreign matter adhering to the photographic film. Therefore, the interpolation method is suitable for correcting the defect portion in this case too.

As described above, amounts of transmitted light when IR-light irradiates a photographic film are not affected by density of images recorded on the photographic film. Therefore, when a photographic film is irradiated with IR-light as described above, to detect scratches and foreign matter on the photographic film, reading can always be carried out under constant reading conditions. Thus, IR-light reading can be carried out while or before reading conditions for readings with R-light, G-light and B-light are computed.

In the present embodiment, an image reading process is performed as described below to take advantage of the fact that IR-light reading can always be carried out under constant reading conditions without being affected by density of an image recorded on a photographic film.

Figure 4:
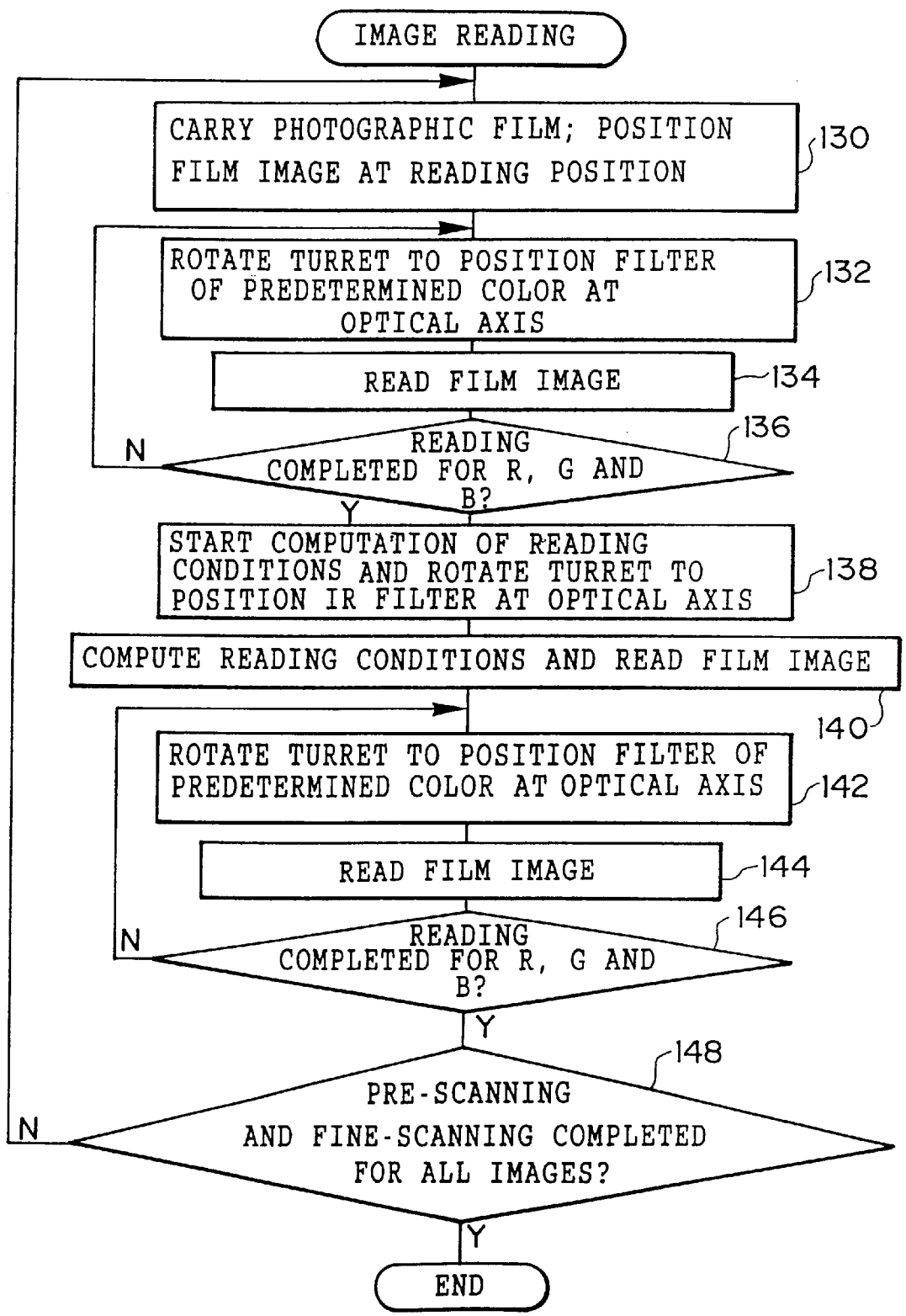
FIG. 4 is a flow chart illustrating an image reading process of a first embodiment.

The image reading process in the present embodiment is explained with reference to the flow chart of FIG. 4. This image reading process is performed at the scanner controlling section 33 of the film scanner 12 in response to image reading instructions from the image processing apparatus 14.

In the image reading process, as explained below, for each image recorded on the photographic film 26, first pre-scanning (reading at a relatively low resolution) is performed, and then fine-scanning (reading at a relatively high resolution) is performed. In an aspect in which an area sensor (area CCD 30) is used as a reading sensor of the present embodiment, switching of reading resolutions (to obtain image data at a different resolution for each time of reading) can be accomplished by, for example, reading an image for pre-scanning at the same high resolution as for fine scanning, and then performing post-processing such as pixel thinning or pixel integration on obtained image data (thereby, lower resolution image data is obtained); or, for fine-scanning, performing several readings at the area sensor by moving the area sensor a distance corresponding to an integer fraction of a pixel spacing with an actuator, such as a piezoelectric device, after each reading (thereby, higher resolution image data is obtained).

In step 130, the photographic film 26 is carried in a predetermined direction by the film carrier 24, and a film image recorded on the photographic film 26 is positioned in a reading position (a position in which an image plane center of the film image coincides with the optical axis L). The film image that is positioned in the reading position is pre-scanned in a next step 132 and following step s.

Specifically, in step 132, the turret 23A is rotarily driven such that one of the filters 23C, 23M and 23Y of the filter section 23, which respectively transmits only one of R-light, G-light and B-light, is selectively positioned on the optical axis L. In a next step 134, a charge accumulation time of the area CCD 30, according to reading conditions for pre-scanning, is set at the CCD driver 31, the diaphragm 21 is moved to a position according to the reading conditions for pre-scanning, and then the film image that is positioned in the reading position is read by the area CCD 30 for a wavelength range (one of R, G and B) corresponding to the filter 23C, 23M or 23Y of the filter section 23 positioned on the optical axis L.

This reading is accomplished by irradiating the film image that is positioned in the reading position with one of R-light, G-light and B-light and accumulating charges that are photoelectrically converted from light transmitted at each portion of the film image by the area CCD 30. Results of the reading by the area CCD 30 (analog signals representing amounts of accumulated charge) are input to the image processing apparatus 14 as one of R, G and B pre-scan image data via the A/D converter 32.

In step 136, whether R, G and B readings (pre-scanning) of the film image that is positioned in the reading position have been completed or not is determined. If the determination is negative, the process returns to step 132, and steps 132 to 136 are repeated until the determination in step 136 is affirmative. Thus, the film image that is positioned in the reading position is read (pre-scanned) for R, G and B.

If the determination in step 136 is affirmative, the process moves onto step 138, where the image processing apparatus 14 begins to compute reading conditions for fine-scanning on the basis of the pre-scan image data that was read at pre-scanning. IR-light reading can always be carried out under constant reading conditions because amounts of transmitted light when IR-light irradiates a photographic film are not affected by density of an image recorded on the photographic film. Thus, in step 138, IR-light reading is performed concurrently with computation of reading conditions. That is, the turret 23A is rotarily driven such that the filter 23IR which transmits only IR-light is positioned on the optical axis. After step 136, fine-scanning is performed.

In step 140, while the image processing apparatus 14 computes reading conditions for fine-scanning, a predetermined charge accumulation time is set at the CCD driver 31, the diaphragm 21 is moved to a predetermined position, and then the film image that is positioned in the reading position is read for IR by the area CCD 30. Results of the reading by the area CCD 30 are input to the image processing apparatus 14 as IR data via the A/D converter 32.

In a next step 142, the turret is rotarily driven such that one of the filters 23C, 23M and 23Y is selectively positioned on the optical axis L. Then, the process moves onto step 144.

In step 144, results of computation of the reading conditions by the image processing apparatus 14, which computation was performed concurrently with the reading (fine-scanning) for IR in step 140, are informed. On the basis of the informed reading conditions, a charge accumulation time of the area CCD 30 is set at the CCD driver 31 and the diaphragm 21 is moved to a position according to the reading conditions. Then, the film image that is positioned in the reading position is read by the area CCD 30 for a wavelength range (one of R, G and B) corresponding to one of the filters 23Y, 23M and 23C of the filter section 23 that is positioned on the optical axis L. Results of reading by the area CCD 30 are input to the image processing apparatus 14 as fine-scan image data of one of R, G and B via the A/D converter 32.

In step 146, whether R, G and B readings (fine-scanning) of the film image that is positioned in the reading position have been completed or not is determined. If the determination is negative, the process returns to step 142, and steps 142 to 146 are repeated until the determination in step 146 is affirmative. Thus, readings (fine-scanning) for R, G and B are sequentially performed.

If the determination in step 146 is affirmative, the process moves onto step 148, where whether pre-scanning and fine-scanning have been completed for all film images of the photographic film or not is determined. If the determination is negative, the process returns to step 130, and steps 130 to 148 are repeated to read a next film image. Specifically, the photographic film 26 is moved by a frame length to position the next film image in the reading position, and pre-scanning and fine-scanning are performed on the next film image as described above.

If the determination in step 148 is affirmative, that is, pre-scanning and fine-scanning have been completed for all the film images, the process ends.

Timings of readings in the present embodiment are as shown in FIG. 5. During pre-scanning, readings are performed with light respectively of R-light, G-light and B-light wavelength ranges. Then, while reading conditions and image processing conditions are computed at the image processing apparatus 14 on the basis of results of pre-scanning, the process moves onto fine-scanning and IR-light reading is performed at a resolution of fine-scanning. When computation of the reading conditions and the image processing conditions by the image processing apparatus 14 has been finished, fine-scanning readings for each of R, G and B are performed and defect portions in an image are detected and corrected. Because reading for defect portions in an image recorded on a photographic film (IR-light reading) is performed only during fine-scanning, reading time can be reduced.

Further, because IR-light reading is performed concurrently with computation of reading conditions for fine-scanning in step 140, reading time can be further reduced. The IR-light reading during fine-scanning may be performed at a time indicated by a dotted line rectangle in FIG. 5, and reading time can be reduced as long as the IR-light reading is performed during the computation of reading conditions for fine-scanning. Timing of readings is shown in FIG. 5 such that readings are performed in an order R, G and B, but the order of R, G and B readings is not limited to such timing and may be any order.

Further, detection and correction of defect portions in an image are performed concurrently (in parallel) with fine-scanning for each of R, G and B. That is, detection computations for scratches and foreign matter, based on results of IR-light reading, are performed during fine-scanning. Thus, reading time can be reduced.

In the present embodiment, pre-scanning and fine-scanning are carried out in succession for each film image recorded on the photographic film 26. However, fine-scanning could be performed after pre-scanning for all film images recorded on the photographic film has been performed; or IR-light reading could be performed for all the film images after pre-scanning for R, G and B for all the film images has been performed, and fine-scanning could be performed thereafter. In such a case, reading conditions could be computed for fine-scanning on the basis of pre-scan image data while IR-light reading is being performed, and reading time could be reduced.

Next, a process performed at the image processor 14 when above described pre-scanning and fine-scanning are performed at the film scanner 12 is explained. Image data obtained by reading with each of R, G and B-light (R, G and B image data) which has been output from the film scanner 12 as results of pre-scanning is input to the controlling section 42 after being corrected at the scanner correction section 36 of the image processing apparatus 14.

At the controlling section 42, each time R, G and B image data of a single film image is input, first, on the basis of the input R, G and B image data, suitable reading conditions are determined such that accumulated charge amounts will be as large as possible, within a range such that saturation of accumulated charge will not occur at individual cells of the area CCD 30 during fine-scanning of the film image corresponding to the image data.

Further, on the basis of the input R, G and B image data, using a set-up operation, the controlling section 42 automatically computes processing conditions for various kinds of image processing for high resolution image data that will be obtained by fine-scanning of the film image corresponding to the image data (fine-scan image data). Then, a defect portion correction process is performed on the basis of R, G and B image data and IR image data obtained after fine-scanning. In the defect portion correction process, defect portions are corrected by using at least one of the luminance modification method and the interpolation method, described above.

When correction is performed on defect portions, because IR-light reading is performed during fine-scanning in the first embodiment, image data obtained by IR-light reading is high resolution image data, the same as image data whose defect portions are to be corrected (R, G and B image data). Therefore, correction of defect portions can be carried out without generating correction errors caused by a difference between resolutions, because there is no difference between the resolution of the image data obtained by IR-light reading and the resolution of the image data whose defect portions are to be corrected.

Second Embodiment

The image processing system 10 relating to the first embodiment carries out the process of reading for defect portions in an image recorded on the photographic film 26 (IR-light reading) during fine-scanning. However, an image processing system 11 relating to a second embodiment is configured such that a controlling section 42 controls timing of IR-light reading; that is, whether or not IR-light reading is performed during pre-scanning and whether or not the same is performed during fine-scanning. The rest of the configuration of the image processing system 11 is the same as in the image processing system 10 relating to the first embodiment. Therefore, the same reference numerals are given to each portion and explanation thereof is omitted.

In the present second embodiment, the control section 42 controls timing of IR-light reading in four patterns as shown in Table 1.

TABLE 1

| Pattern | Pre-scanning | Fine-scanning |
|---------|--------------|---------------|
| 1 | ON | ON |
| 2 | ON | OFF |
| 3 | OFF | ON |
| 4 | OFF | OFF |

In Table 1, "ON" means that IR-light reading is performed, and "OFF" means that IR-light reading is not performed.

Table 1 shows patterns of combinations in which IR-light reading is performed or is not performed respectively during pre-scanning and during fine-scanning. When IR-light reading is performed during pre-scanning, defect portions are detected and corrected on the basis of low resolution IR data. Therefore, data processing time can be reduced, defect portions can be detected and corrected in a short time, and an image test for defect portions can be carried out on the basis of a displayed image on the display 43 or the like before fine-scanning. However, because defect portions are detected and corrected on the basis of the low resolution IR data, correction errors for correction area, correction level, and the like may be large. On the other hand, when IR-light reading is performed during fine-scanning, defect portions are detected and corrected on the basis of high resolution IR data. Thus, the above-mentioned correction errors can be suppressed. However, there is a problem in that an image test on the basis of a displayed image on the display 43 or the like cannot be carried out during fine-scanning.

Ideally, performing IR-light reading both during pre-scanning and during fine-scanning, performing an image test on the basis of pre-scan IR data, and then correcting the defect portions on the basis of fine-scan IR data is desirable. However, a lot of time is spent on detecting (correcting) defect portions in an image. Accordingly, the present embodiment is configured such that the controlling section 42 can select a reading pattern from the patterns shown in Table 1 depending on required levels of accuracy in correction and processing speed.

Figure 6A:
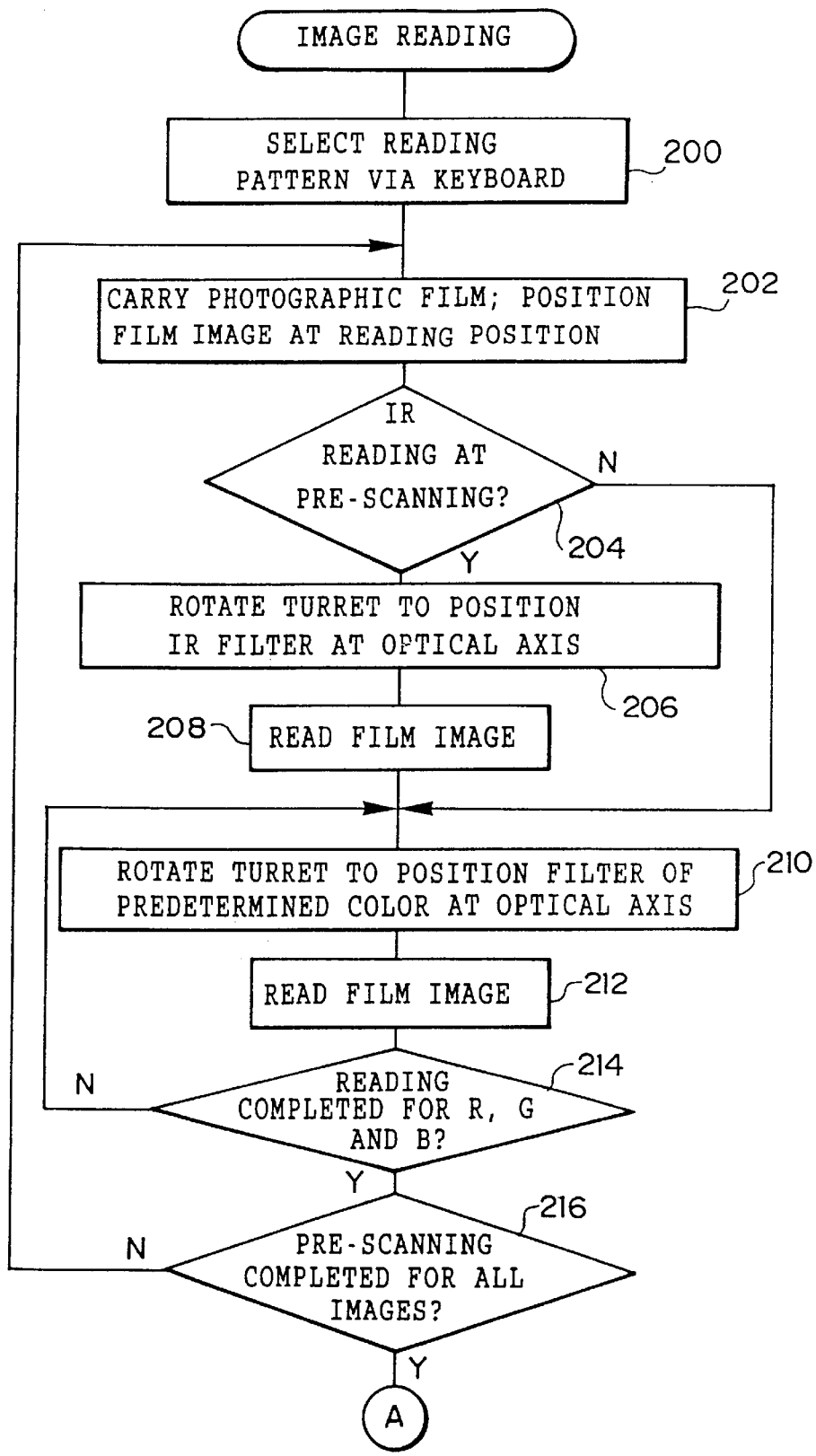
FIGS. 6A and 6B are a flow chart illustrating an image reading process of a second embodiment.
Figure 6B:
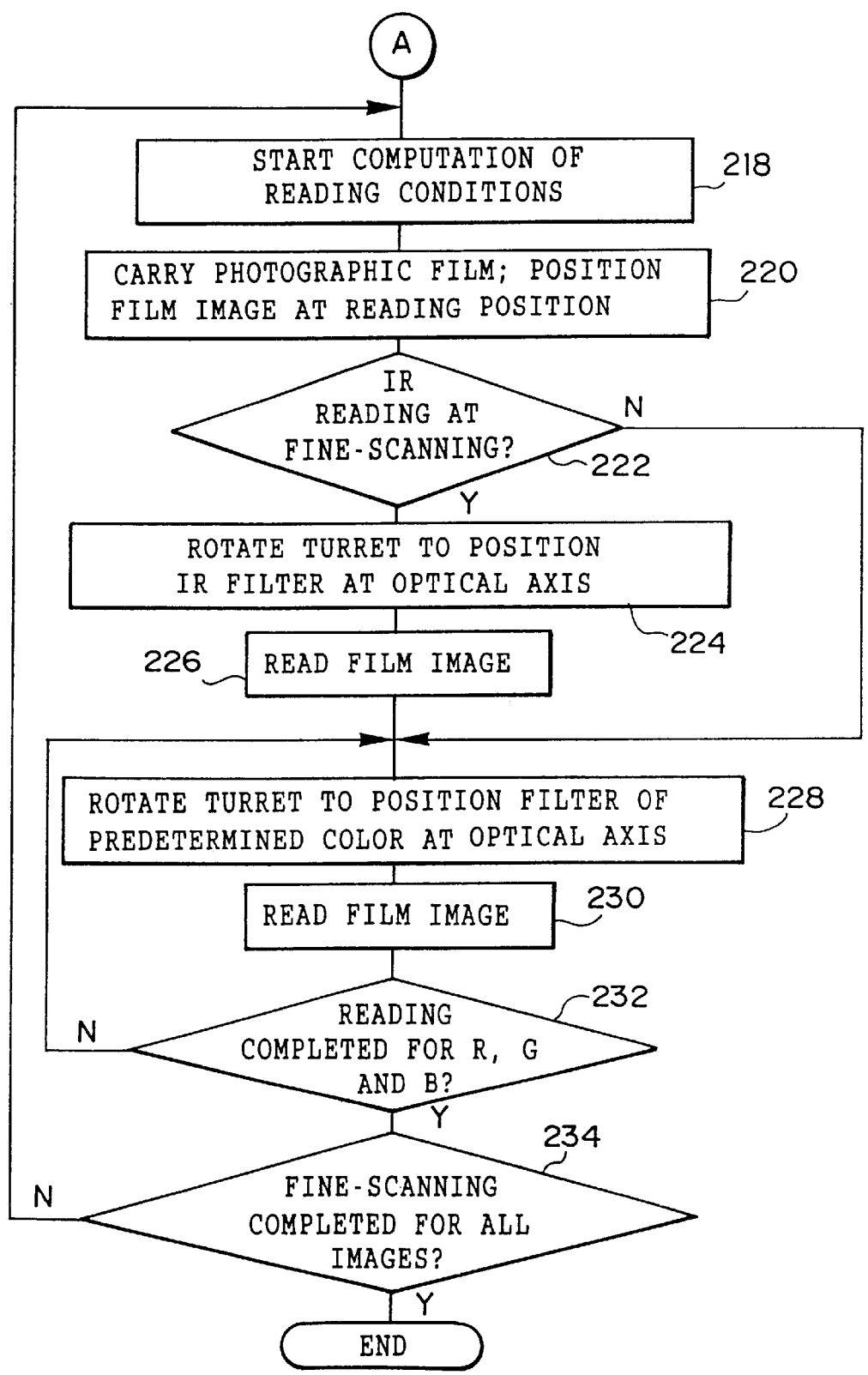

Next, an image reading process of the second embodiment is explained with reference to the flow chart of FIGS. 6A and 6B.

In the image reading process of the second embodiment, each image recorded on the photographic film 26 is pre-scanned (read at a relatively low resolution), and then fine-scanned (read at a relatively high resolution) as in the first embodiment, and resolution can be switched as described in the first embodiment. In the first embodiment, after a film image recorded on the photographic film is pre-scanned and fine-scanned, the photographic film is moved a frame length, and subsequent film images are successively pre-scanned and fine-scanned. In the second embodiment, however, all of the film images are fine-scanned after all of the film images have been pre-scanned.

In step 200, an operator selects a desired reading pattern from the patterns shown in Table 1 above (four patterns), and inputs the selection via the keyboard 44. Thus, the reading pattern is determined. As described above, the reading pattern is determined depending on requirements for accuracy of correction of defect portions in the film images recorded on the photographic film and processing speed of correction of the defect portions.

In a next step 202, the photographic film 26 is carried in a predetermined direction by the film carrier 24, such that a film image recorded on the photographic film 26 is positioned in a reading position (a position in which an image plane center of the film image coincides with the optical axis L). Then, the process moves onto step 204.

In step 204, whether or not IR-light reading is performed during pre-scanning in the reading pattern that was input via the keyboard 44 in step 200 is determined. If the determination is affirmative, the process moves onto step 206. In step 206, the turret 23A is rotarily driven such that the filter 23IR which transmits only IR-light is positioned on the optical axis L. In step 208, a predetermined charge accumulation time is set at the CCD driver 31, the diaphragm 21 is moved to a predetermined position, and the film image that is positioned in the reading position is read for IR by the area CCD 30. Results of the reading by the area CCD 30 are input to the image processing apparatus 14 as IR data via the A/D converter 32.

If the determination in step 204 is negative, the above-described step 206 and step 208 are not performed. Thus, time required for reading each film image can be reduced.

In a next step 210, the turret 23A is rotarily driven such that one of the filters 23C, 23M and 23Y of the filter section 23, which respectively transmit only one of R-light, G-light and B-light, is selectively positioned on the optical axis L. In a next step 212, a charge accumulation time of the area CCD 30,according to reading conditions for pre-scanning, is set at the CCD driver 31, the diaphragm 21 is moved to a position according to the reading conditions for pre-scanning, and then the film image that is positioned in the reading position is read by the area CCD 30 for a wavelength range (one of R, G and B) corresponding to the filter 23C, 23M or 23Y of the filter section 23 positioned on the optical axis L.

This reading is accomplished by irradiating the film image that is positioned in the reading position with one of R-light, G-light and B-light and accumulating charges that are photoelectrically converted from light transmitted at each portion of the film image by the area CCD 30. Results of the reading by the area CCD 30 (analog signals representing amounts of accumulated charge) are input to the image processing apparatus 14 as one of R, G and B pre-scan image data via the A/D converter 32.

In step 214, whether R, G and B readings (pre-scanning) of the film image that is positioned in the reading position have been completed or not is determined. If the determination is negative, the process returns to step 202, and steps 202 to 214 are repeated until the determination in step 214 is affirmative. Thus, the film image that is positioned in the reading position is sequentially read (pre-scanned) for R, G and B.

If the determination in step 214 is affirmative, the process moves onto step 216. In step 216, whether pre-scanning for all the film images recorded on the photographic film 26 has been completed or not is determined. If the determination is negative, the process returns to step 202 to position a next film image in the reading position, and pre-scanning as described above is repeated. When all the film images have been pre-scanned, the determination in step 216 is affirmative, and the process moves onto step 218 to perform fine-scanning.

In step 218, computation of reading conditions for fine-scanning on the basis of pre-scan image data obtained by the pre-scanning begins. In a next step 220, the photographic film is carried by the film carrier 24 (for example, in a direction opposite to a direction of pre-scanning) to position a film image recorded on the photographic film 26 in the reading position.

In a next step 222, whether or not IR-light reading is performed during fine-scanning in the reading pattern that was input via the keyboard 44 in step 200 is determined. If the determination is affirmative, the process moves onto step 224. In step 224, the turret 23A is rotarily driven so that the filter 23IR which transmits only IR-light is positioned on the optical axis L. In step 226, a predetermined charge accumulation time is set at the CCD driver 31, the diaphragm 21 is moved to a predetermined position, and the film image that is positioned in the reading position is read for IR by the area CCD 30. Results of the reading by the area CCD 30 are input to the image processing apparatus 14 as IR data via the A/D converter 32. Concurrently with step 224 and step 226, computation of reading conditions for fine-scanning is performed by the image processing apparatus 14 on the basis of the pre-scan image data obtained by pre-scanning in this timing.

If the determination in step 222 is negative, the above-described step 224 and step 226 are not performed and the process moves onto step 228. Thus, time required for reading each film image can be reduced.

In a next step 228, the turret 23A is rotarily driven such that one of the filters 23C, 23M and 23Y of the filter section 23, which respectively transmit only one of R-light, G-light and B-light, is selectively positioned on the optical axis L. In a next step 230, of reading conditions for fine-scanning informed from the image processing apparatus 14, reading conditions which correspond to the film image that is positioned in the reading position are taken, and a charge accumulation time of the area CCD 30, according to the thus taken reading conditions, is set at the CCD driver 31, the diaphragm 21 is moved to a position according to the reading conditions, and then the film image that is positioned in the reading position is read by the area CCD 30 for a wavelength range (one of R, G and B) corresponding to the filter 23C, 23M or 23Y of the filter section 23 that is positioned on the optical axis L. Results of reading by the area CCD 30 are input to the image processing apparatus 14 as one of R, G and B fine-scan image data via the A/D converter 32.

In step 232, whether R, G and B readings (fine-scanning) of the film image that is positioned in the reading position have been completed or not is determined. If the determination is negative, the process returns to step 228, and steps 228 to 232 are repeated until the determination in step 232 is affirmative. Thus, the film image that is positioned in the reading position is sequentially read (fine-scanned) for R, G and B.

If the determination in step 232 is affirmative, the process moves onto step 234, where whether fine-scanning has been completed for all film images recorded on the photographic film 26 or not is determined. If the determination is negative, the process returns to step 218 to position a next film image in the reading position, and fine-scanning as described above (step 218 to step 234) is repeated. When all the film images have been fine-scanned, the determination in step 234 is affirmative and the image reading process ends.

Hence, in the second embodiment, an intended reading of the photographic film 26 can be carried out according to desired requirements (for example, a case in which high speed reading is desired and accuracy in correction for defect portions is not required or, conversely a case in which highly accurate correction for defect portions is desired even if reading speed is slow) by selecting whether or not IR-light reading to detect defect portions will be performed respectively during pre-scanning and fine-scanning, and inputting the selection via the keyboard 44 in the first step of the image reading process, step 200.

In the process of the second embodiment, a reading pattern is selected for reading of all the film images recorded on the photographic film. However, reading patterns could be selected individually for each film image recorded on the photographic film.

Further, the second embodiment is described as performing fine-scanning after all the film images recorded on the photographic film have been pre-scanned. However, pre-scanning and fine-scanning could be carried out in succession for each film image recorded on a photographic film 26 as in the first embodiment.

The above-described examples of an image reading apparatus which reads images recorded on the photographic film 26 are configured such that an area sensor (the area CCD 30) having photoelectric converting cells arrayed in a matrix reads the images. However, the present invention is not limited to the above-described configuration, and the image reading apparatus may be configured such that a line sensor, having photoelectric converting cells arrayed in a line, reads images. Further, in the above-described configuration, the images are read by photoelectrically converting light transmitted through the photographic film 26. However, the present invention is not limited to the above-described configuration, and a configuration in which images are read by photoelectrically converting light reflected from the photographic film 26 may be employed.

Furthermore, the above-described examples of correction methods applicable to correction of defect portions include the interpolation method and the luminance modification method. However, the present invention is not limited to these examples, and a correction method in which defect portions are blurred by subjecting the defect portions to low-pass filtering, or such a correction method in which a light diffusion plate is inserted on an optical path between the light source 20 of the film scanner 12 and the photographic film 26, to make defect portions unobtrusive, may be employed.

As explained above, the image reading apparatus relating to the present invention reduces reading time when detection of defect portions in an image is performed.

Further, the image reading apparatus relating to the present invention has an excellent effect in that an image to be read can be read according to desired requirements.

What is claimed is:

1. An image reading apparatus comprising:
   a reader which reads an image recorded on an image recording material;
   a detector which irradiates the image recording material with first light in an invisible region and detects second light in the invisible region which is one of the first light transmitted through and reflected from an image recording area in which the image is recorded; and
   a controller which effects control such that a preliminary reading of the image is performed by said reader, after which detection of the second light in the invisible region is performed by said detector, after which, a fine reading of the image is performed by said reader under reading conditions determined on the basis of information obtained by the preliminary reading.

2. An image reading apparatus according to claim 1, wherein said controller starts detection of the second light in the invisible region by said detector before determination of the reading conditions has finished.

3. An image reading apparatus according to claim 1, wherein the fine reading and detection of the second light in the invisible region by said detector are performed at a same resolution.

4. An image reading apparatus according to claim 1, wherein the second light in the invisible region is an infrared light.

5. An image reading apparatus comprising:
   a reader which reads an image recorded on an image recording material;
   a detector which irradiates the image recording material with first light in an invisible region and detects second light in the invisible region which is one of the first light transmitted through and reflected from an image recording area in which the image is recorded;

an input section for inputting information that instructs whether or not detection of the second light in the invisible region by said detector is performed and, if detection of the second light in the invisible region is to be performed, information that instructs an execution timing of the detection of the second light in the invisible region; and a controller which effects control such that a preliminary reading of the image is performed by said reader, after which a fine reading of the image is performed by said reader under reading conditions determined on the basis of information obtained by the preliminary reading and, if the detection of the second light in the invisible region has been instructed via said input section, effects control such that the second light in the invisible region is detected by said detector at at least one of the preliminary reading and the fine reading in accordance with the instructed execution timing.

6. An image reading apparatus according to claim 5, wherein the fine reading and detection of the second light in the invisible region by said detector are performed at a same resolution when the detection of the second light in the invisible region is performed at the fine reading.

7. An image reading apparatus according to claim 5, wherein the preliminary reading and detection of the second light in the invisible region by said detector are performed at a same resolution when the detection of the second light in the invisible region is performed at the preliminary reading.

8. An image reading apparatus according to claim 5, wherein the second light in the invisible region is an infrared light.

* * * * *